May 8, 1928.
W. G. BEATTY
WASHING MACHINE
Filed Oct. 22, 1925
1,668,624
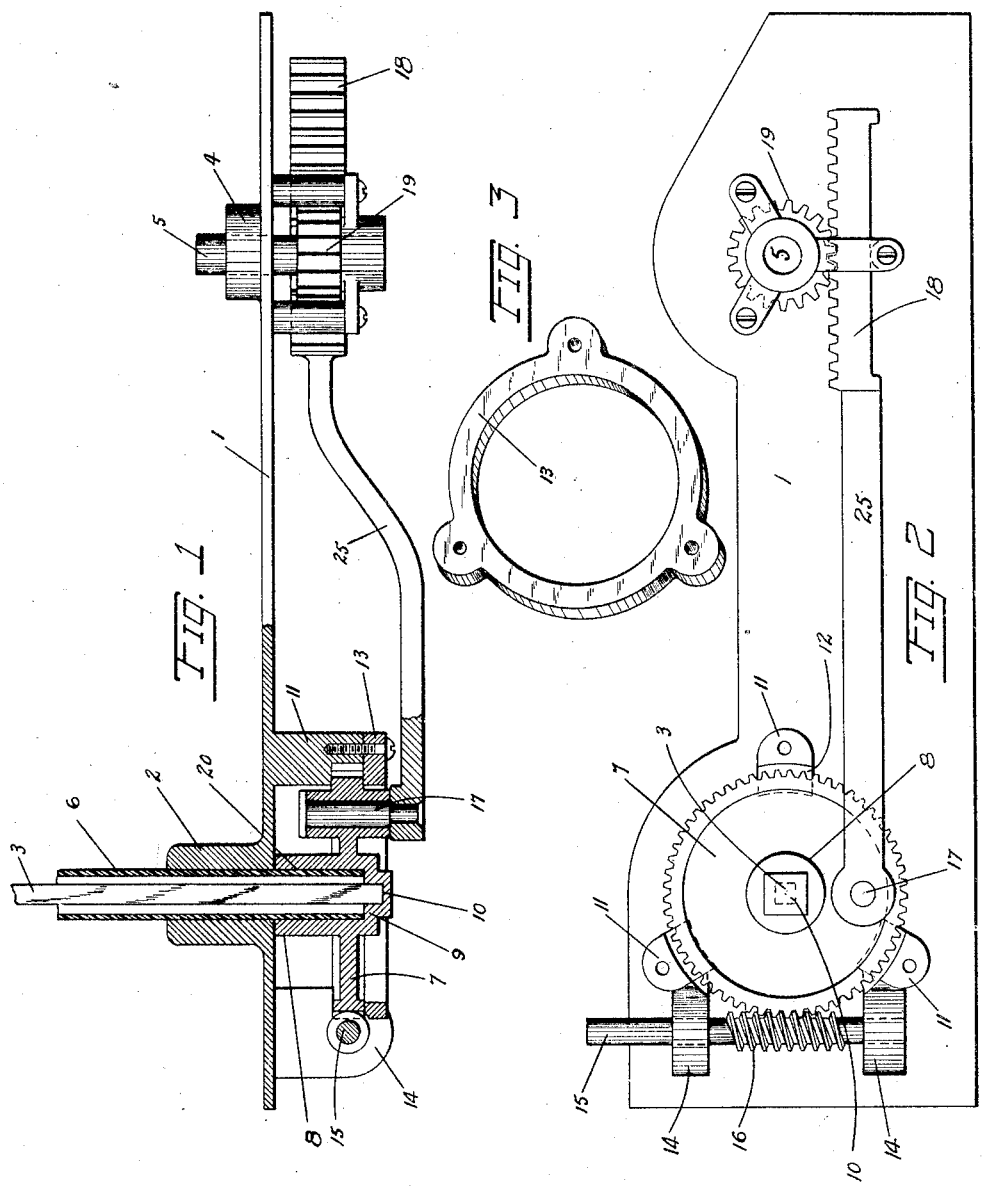

Patented May 8, 1928.

1,668,624

UNITED STATES PATENT OFFICE.

WILLIAM GEORGE BEATTY, OF FERGUS, ONTARIO, CANADA.

WASHING MACHINE.

Application filed October 22, 1925. Serial No. 64,185.

My invention relates to a washing machine comprising a rotating element, for instance a worm wheel or gear wheel, mounted on a stationary hollow or tubular shaft, and is characterized by a wringer shaft revoluble in the hollow or tubular shaft and actuated by the rotating element. In the preferred construction, the machine is provided with a bed plate and the stationary shaft, which is of relatively large diameter and of considerable length, extends through, and projects above and below, the bed plate. The hub of the rotating element has a bore of corresponding diameter and length to that part of the shaft projecting below the bed plate. The hub is mounted, for the full length of its bore, on the shaft and engages the under surface of the bed plate. By reason of its relatively large diameter and length of hub, the bearing between the rotating element and shaft, if a close fit is maintained, holds the rotating element in constant alignment, and the engagement of the upper end of the hub with the under face of the bed plate resists the upward and rocking thrusts to which the rotating element is subjected. The tendency of the rotating element to be rocked by the reciprocating push and pull of the rack and its connecting rod, is theoretically overcome by supporting the rotating element in a raceway below the bed plate. This raceway is conveniently formed by three equispaced, annularly arranged, blocks integrally formed with and projecting from the under surface of the bed plate in concentric relation to the shaft. The inner faces of these blocks are stepped or rabbeted to a depth slightly greater than the thickness of the rotating element, and a supporting ring or plate is bolted to the blocks below the rotating element to complete the raceway and resist the downward thrust of the rotating element. The rotating element is placed in this raceway, and that part of the hub at the upper side of the rotating element extends into contact with the under side of the bed plate for steadying its rotation as it revolves on the shaft. That part of the hub at the under side of the rotating element is formed or provided with a hub cap in the centre of which is a step corresponding in cross section to, and in which is entered, the wringer shaft.

For an understanding of the invention reference is to be had, to the following description, and, to the accompanying drawings, in which:—

Fig. 1, is a side elevation showing the bed plate, and the mechanism for actuating the wringer and agitator.

Fig. 2, is an inverted plan view of the parts shown in Fig. 1, with the exception of the ring for supporting the rotating element; and Fig. 3, is a perspective view of the ring.

As shown in the drawings, the rotating element 7 is formed with a hub 8 which extends beyond both sides of the rotating element, and the bed plate 1, which may be of any appropriate shape and dimensions, is formed at or near one end with a tubular boss 2, the bore of which extends through the bed plate, and at or near the other end with a similar boss 4. Pressed through the bore of, and stationary in, the boss 2 is a tubular shaft 6, for the rotating element, and this shaft extends below the bed plate for the full length of the bore 20 in the hub 8. The hub 8, at its lower end, is provided with a hub cap 9, and the inner surface of the hub cap is formed with a step 10 for the lower end of the wringer shaft 3. In the construction shown, that part of the hub 8, at the upper side of the rotating element, is extended upwardly to engage the under surface of the bed plate 1, and the shaft 6 is extended below the bed plate 1, a distance corresponding to the full depth of the bore 20, to provide a substantial axis for the revolution of the rotating element.

Extending downwardly from the under surface of the bed plate 1 are three equispaced blocks 11 which are concentric with the bore of the boss 2 and so positioned as to form a raceway 12 for the rotating element. In forming this raceway the inner surfaces of the blocks 11 are stepped or rabbeted, from their lower end upwards, a distance slightly greater than the thickness of the rotating element, to provide sufficient clearance, only, for its free revolution without lateral movement. A supporting ring 13 is bolted to the bottom surfaces of the blocks 11, and this ring engages the rim face of the rotating element and prevents the latter being rocked by the reciprocating push and pull of the rack and connecting rod.

Extending downwardly from the bed plate, beyond the perimeter of the rotating element, are bearings 14 in which is mounted a shaft 15. The shaft 15 has a worm 16 meshing with the teeth of the rotating element which is shown to take the form of a gear wheel. The agitator shaft 5 is journalled in the boss 4 and is provided with a pinion 19 with which meshes the reciprocating rack 18. This rack is formed with an elongated arm 25 connected by a wrist pin 17 with the gear wheel 7.

In the assembly of the parts, the gear wheel 7 is supported by the ring 13 in the raceway 12 with its hub 8 journalled on the projecting part of the shaft 6 and extending into contact with the adjacent surface of the bed plate. The downward displacement of the gear wheel 7 is prevented by the supporting ring 13 and its upward displacement is prevented by the blocks 11 and the engagement of its hub 8 with the bed plate 1.

The wringer shaft 3 is extended through the tubular shaft 6 and its lower end is removably entered into the step 10 of the hub cap 9. As shown in the drawings the lower end of the wringer shaft is rectangular in cross section and the step corresponds in cross sectional shape and dimensions to it, so that the rotation of the gear wheel will cause the rotation of the wringer shaft and drive the wringer parts. This assembly maintains the fixed position of the gear wheel and provides for the actuation of the wringer and agitator by the same rotating element.

A wheel or other rotating element, having a hub in which the wringer shaft can be entered, or to which it may be secured, may be substituted for the gear wheel and means other than those described may be employed for effecting the joint rotation of the wringer shaft and rotating element.

Having thus fully described my invention, what I claim as new and desire to secure by Letters Patent is:—

1. In a washing machine the combination of a plate, a stationary tubular shaft entered through and extending below the plate, a gear wheel rotatably mounted on the stationary tubular shaft below the plate, and an operable shaft entered through the tubular shaft supported by and actuated by the gear wheel.

2. In a washing machine the combination of a plate, a stationary tubular shaft entered through and extending below the plate, a gear wheel rotatably mounted on the stationary tubular shaft below the plate, and an operable shaft entered through the tubular shaft removably supported by and actuated by the gear wheel.

3. In a washing machine the combination of a plate, a stationary tubular shaft entered through and extending below the plate, a rotating element mounted on the tubular shaft below the plate, a step in the rotating element, and a wringer shaft entered through the tubular shaft and seated in said step, said wringer shaft being driven by the rotating element.

4. A washing machine comprising a plate, a stationary tubular shaft entered through and extending below the plate, a rotating element mounted on the tubular shaft below the plate, and a wringer shaft entered through the tubular shaft and driven by the rotating element, in combination with an agitator shaft, a pinion for the agitator shaft, and a rack meshing therewith reciprocated by the rotating element.

5. In a washing machine, an agitator shaft, a pinion for the agitator shaft, a rack meshing therewith, a gear wheel for causing the reciprocating movement of the rack, a hollow hub for the gear wheel, means connecting the rack and gear wheel, and means for causing the rotation of the gear wheel, in combination with a bed plate, having blocks extending downward from its lower surface forming part of a raceway for the gear wheel, a supporting ring secured to the blocks forming the other part of the raceway, a hollow boss on the upper surface of, and the bore of which extends through, the bed plate and is concentric with the raceway, a tubular shaft, forming an axis for the hub of the gear wheel, extending through said boss, and a wringer shaft, extending through said tubular shaft and entered in the hub of, and rotated by, the gear wheel.

6. In a washing machine, an agitator shaft, a pinion for the agitator shaft, a rack meshing with said pinion, a gear wheel for causing the reciprocating movement of the rack, a hollow hub for the gear wheel, means connecting the rack and gear wheel, and means for causing the rotation of the gear wheel, in combination with a bed plate having blocks extending downward from its lower surface, forming part of a raceway for the gear wheel, a supporting ring secured to the blocks forming the other part of the raceway, a hollow boss on the upper surface of the bed plate, the bore of which extends through the bed plate and is concentric with the raceway, a stationary tubular shaft, extending through said boss, forming an axis for the hub of the gear wheel, and a wringer shaft extending through said tubular shaft and entered in the hub of the gear wheel, said hub at one end engaging the bed plate, and at the other end having a cap in which the adjacent end of the wringer shaft is stepped.

Signed at the said town of Fergus, this 13th day of October, A. D. 1925.

WILLIAM GEORGE BEATTY.